(12) United States Patent
Nair et al.

(10) Patent No.: US 10,267,281 B2
(45) Date of Patent: Apr. 23, 2019

(54) FILTER FOR FUEL INJECTION SYSTEMS

(71) Applicant: Caterpillar Inc., Peoria, IL (US)

(72) Inventors: Siddharth Nair, Dunlap, IL (US); Manjunath Bannur Nagaraja, Naperville, IL (US); Ramshankar Muthukumar, Chennai (IN); Ponraj Balasundaram, Chennai (IN)

(73) Assignee: Caterpillar Inc., Deerfield, IL (US)

( * ) Notice: Subject to any disclaimer, the term of this patent is extended or adjusted under 35 U.S.C. 154(b) by 71 days.

(21) Appl. No.: 15/483,160

(22) Filed: Apr. 10, 2017

(65) Prior Publication Data
US 2018/0291853 A1    Oct. 11, 2018

(51) Int. Cl.
| | |
|---|---|
| *F02M 61/16* | (2006.01) |
| *B01D 29/44* | (2006.01) |
| *F02M 37/22* | (2019.01) |
| *B01D 29/58* | (2006.01) |

(52) U.S. Cl.
CPC ........... *F02M 61/165* (2013.01); *B01D 29/44* (2013.01); *B01D 29/58* (2013.01); *F02M 37/22* (2013.01); *F02M 2200/27* (2013.01)

(58) Field of Classification Search
None
See application file for complete search history.

(56) References Cited

U.S. PATENT DOCUMENTS

| | | | |
|---|---|---|---|
| 4,312,479 A | 1/1982 | Tolan | |
| 6,461,506 B1 | 10/2002 | Bradford | |
| 6,536,417 B2 | 3/2003 | Pearlman et al. | |
| 2002/0074272 A1 | 6/2002 | Golovatai-Schmidt | |
| 2004/0069704 A1* | 4/2004 | Yamaguchi | B01D 29/35 210/497.01 |
| 2006/0138040 A1 | 6/2006 | Buehler | |
| 2009/0120869 A1 | 5/2009 | Harkema et al. | |
| 2015/0369176 A1* | 12/2015 | Ittlinger | B01D 29/56 239/575 |

FOREIGN PATENT DOCUMENTS

| | | | |
|---|---|---|---|
| EP | 1055815 | | 11/2000 |
| EP | 1918576 | * | 5/2007 |
| EP | 1918576 | | 5/2008 |
| JP | H08312494 | | 11/1996 |

* cited by examiner

*Primary Examiner* — Benjamin M Kurtz (57) ABSTRACT

A filter for a fuel injection system includes a body that defines a longitudinal axis, a first end face, a second end, an outer surface extending between the first end face and the second end, an inner surface defining an inner chamber closed at the first end face and open at the second end. The body also defines at least one perforated portion formed in the outer surface extending from the outer surface to the inner surface, at least one slot extending axially along the outer surface. The slot is open and is in fluid communication with the first end face and defines an edge along the outer surface. The edge provides fluid communication between the slot and the perforated portion. Additionally, the edge and an inlet channel of the fuel injection system are adapted to define a first filtration zone. The perforated portion defines a second filtration zone.

20 Claims, 5 Drawing Sheets

FILTER FOR FUEL INJECTION SYSTEMS

TECHNICAL FIELD

The present disclosure relates to fuel injectors in internal combustion engines. More particularly, the present disclosure relates to a filter for fuel injectors that includes multiple filtration zones to filter a fuel supplied to the fuel injectors.

BACKGROUND

Fuel systems, such as common rail fuel injection systems, are well known to provide pressurized fuel injection to internal combustion engines. Such fuel injection systems generally include fuel injectors that are coupled to a common rail by high pressure conduits supplying fuel to the fuel injectors. In some examples, pressures in such common rails range between 250 bar and 2200 bar (i.e. between 3,600 psi and 32,000 psi). Fuel injectors applied in such high pressure environments are susceptible to low quality fuel. For example, debris and impurities in the fuel flow may erode one or more sealing surfaces of the fuel injectors, affecting tolerances of injector components, and thus shortening injector life. In some cases, debris and impurities may obstruct or clog the injector nozzle, affect accuracies of fuel injection events, and cause unacceptable injector performance.

United States Publication No. 2009/120869 relates to an edge filter for fitting in a high-pressure conduit of a fuel injection system. The edge filter comprises a filter section formed of inlet channels and outlet channels, separated by ridges having annular grooves. The ridges have a predetermined diameter such that the difference between the predetermined diameter and the conduit diameter defines an annular gap and the width of each annular groove is equal to or greater than the annular gap and less than the depth of each groove.

SUMMARY OF THE INVENTION

In one aspect, the disclosure is directed towards a filter for a fuel injection system. The filter includes a body that defines a longitudinal axis, a first end face, a second end opposite the first end face, an outer surface extending between the first end face and the second end, an inner surface defining an inner chamber closed at the first end face and open at the second end. The body also defines at least one perforated portion formed in the outer surface extending from the outer surface to the inner surface, and at least one slot extending axially along the outer surface. The at least one slot is open and is in fluid communication with the first end face and defines an edge along the outer surface. The edge provides fluid communication between the at least one slot and the at least one perforated portion. The edge and an inlet channel of the fuel injection system are adapted to define a first filtration zone and the perforated portion defines a second filtration zone.

In another aspect, the disclosure relates to a fuel injection system for an engine. The fuel injection system includes an inlet channel and a filter. The inlet channel is adapted to receive fuel. The filter is positioned within the inlet channel. The filter includes a body that defines a longitudinal axis, a first end face, a second end opposite the first end face, an outer surface extending between the first end face and the second end, an inner surface defining an inner chamber closed at the first end face and open at the second end. The body further defines at least one perforated portion formed in the outer surface extending from the outer surface to the inner surface, and at least one slot extending axially along the outer surface. The at least one slot is open and is in fluid communication with the first end face and defines an edge along the outer surface. The edge provides fluid communication between the at least one slot and the at least one perforated portion. The edge and the inlet channel define a first filtration zone and the perforated portion defines a second filtration zone.

In yet another aspect, the present disclosure is directed towards a fuel injector for a fuel injection system. The fuel injector includes an inlet arm and a filter. The filter arm includes an inlet channel that is configured to receive fuel. The filter is positioned within the inlet channel. The filter has a body that defines a longitudinal axis, a first end face, a second end opposite the first end face, an outer surface extending between the first end face and the second end, an inner surface defining an inner chamber closed at the first end face and open at the second end. The body further defines at least one perforated portion formed in the outer surface extending from the outer surface to the inner surface, and at least one slot extending axially along the outer surface. The at least one slot is open and is in fluid communication with the first end face and defines an edge along the outer surface. The edge provides fluid communication between the at least one slot and the at least one perforated portion. The edge and the inlet channel define a first filtration zone, while the perforated portion defines a second filtration zone. Moreover, the open, second end of the filter facilitates a release of the fuel from the filter.

DETAILED DESCRIPTION

Figure 1:
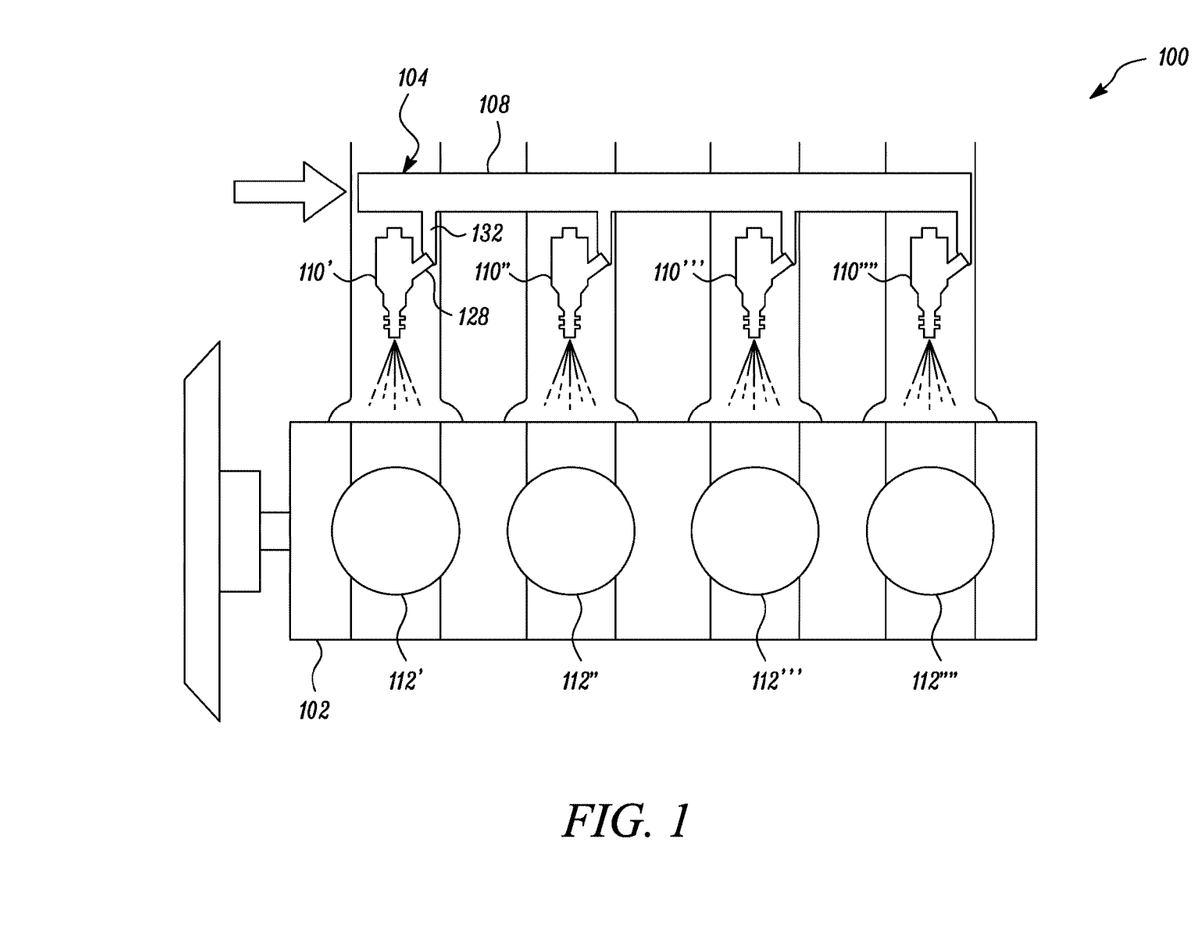
FIG. 1 is a schematic view of an engine system with a fuel injection system, in accordance with the concepts of the present disclosure.

Referring to FIG. 1, an engine system 100 is shown. The engine system 100 includes an internal combustion engine 102, and a fuel injection system 104 for the internal combustion engine 102. The internal combustion engine 102 may be simply referred to as engine 102. The engine 102 may be a compression ignition engine, such as a diesel engine, although aspects of the present disclosure may be applied to several engine types. In some examples, the engine 102 may be applicable in machines that are associated with construction, mining, forestry, agriculture, stationary power, etc.

The fuel injection system 104 may be configured to inject a fuel, such as diesel fuel, into one or more combustion chambers of the engine 102. A delivery of the fuel into the combustion chamber and a subsequent combustion of the fuel may produce engine power. The fuel injection system 104 includes a common rail 108 and a number of fuel injectors. In the depicted example, the fuel injection system 104 includes four fuel injectors, namely a first fuel injector 110', a second fuel injector 110", a third fuel injector 110''', and a fourth fuel injector 110''''. Each of the fuel injectors 110', 110", 110''', 110'''' may be fluidly coupled to the common rail 108 so as to receive fuel from the common rail 108. These fuel injectors 110', 110", 110''', 110'''' may also be respectively coupled to one or more cylinders of the engine 102 for delivering fuel into the combustion chambers of the engine 102. For example, the cylinders of the engine 102 are four in number, namely a first cylinder 112', a second cylinder 112", a third cylinder 112''', and a fourth cylinder 112''''. Given that the fuel injectors 110', 110", 110''', 110'''' are respectively coupled to the cylinders 112', 112", 112''', 112'''', a separate fuel injection in each cylinder of the engine 102 is possible. According to a general practice of the art, fuel may be provided to the common rail 108 from a fuel source, such as a fuel tank (not shown), and then the fuel may be passed through the common rail 108 and then be received by the fuel injectors 110', 110", 110''', 110''''. The fuel injectors 110', 110", 110''', 110'''' may then inject the fuel into the engine 102 (i.e. into the combustion chambers of the engine 102). A pressurizing source, such as a pump (not shown) may pressurize the fuel in the common rail 108 for a passage and delivery of the fuel to the engine 102. Although not limited, the fuel injection system 104 may be a direct injection system. Also, it is possible that a lesser or a higher number of fuel injectors (and an engine with a corresponding number of cylinders) be used. It may be understood that aspects of the present disclosure are not limited to the above description in any way.

Figure 2:
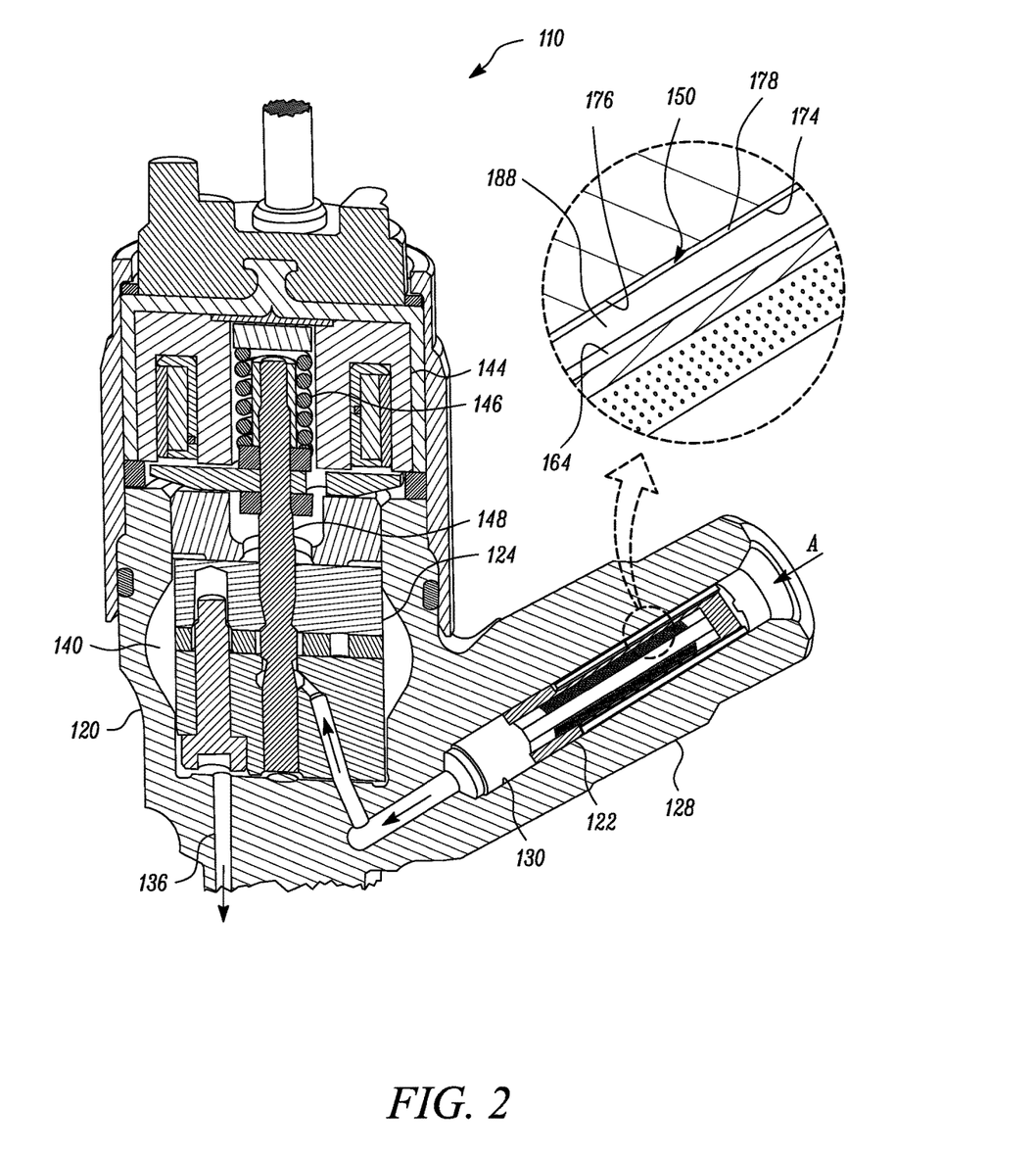
FIG. 2 is a fuel injector of the fuel injection system of FIG. 1 having a filter disposed within an inlet channel of the injector, in accordance with the concepts of the present disclosure.

Referring to FIG. 2, out of the four fuel injectors 110', 110", 110''', 110'''', the first fuel injector 110' is shown and described. For ease of reference and understanding, the first fuel injector 110' may be simply referred to as fuel injector 110. It will be understood that a description directed towards the fuel injector 110 will be applicable to all remaining fuel injectors 110", 110''', 110'''' of the fuel injection system 104.

The fuel injector 110 includes an injector body 120, a filter 122, and a control valve 124. The injector body 120 includes an inlet arm 128 that defines an inlet channel 130. The fuel injector 110 may be fluidly coupled to the common rail 108 (or to a conduit 132 of the common rail 108, see FIG. 1) via the inlet channel 130 to receive fuel from the common rail 108. The injector body 120 may also include an outlet channel 136 for a release and a delivery of the fuel into a corresponding combustion chamber of the engine 102. Additionally, the injector body 120 may include an interior space 140 that may accommodate the control valve 124 and associated components of the control valve 124. The control valve 124 may include a solenoid mechanism 144, a biasing member 146, and a valve pin 148, each of which may work in concert to vary a passage of fuel flow defined within the fuel injector 110. In this manner, the control valve 124 may regulate an injection and release of fuel into the engine 102 through the outlet channel 136. A construction and working of such a control valve, for a regulation of fuel flow through the outlet channel 136, is well known, and thus will not be discussed any further.

Figure 3:
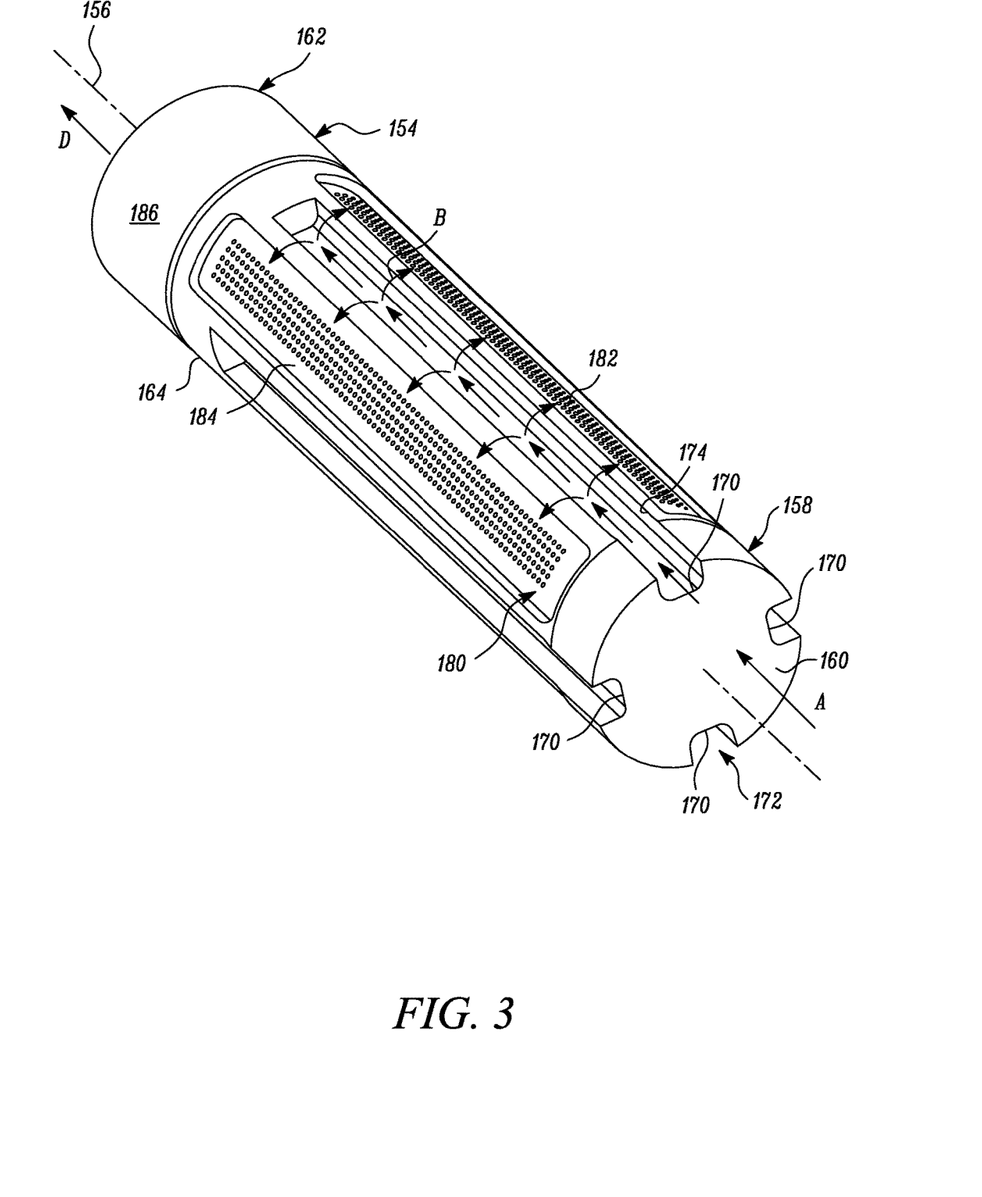
FIG. 3 is a front isometric view of the filter, in accordance with the concepts of the present disclosure.
Figure 4:
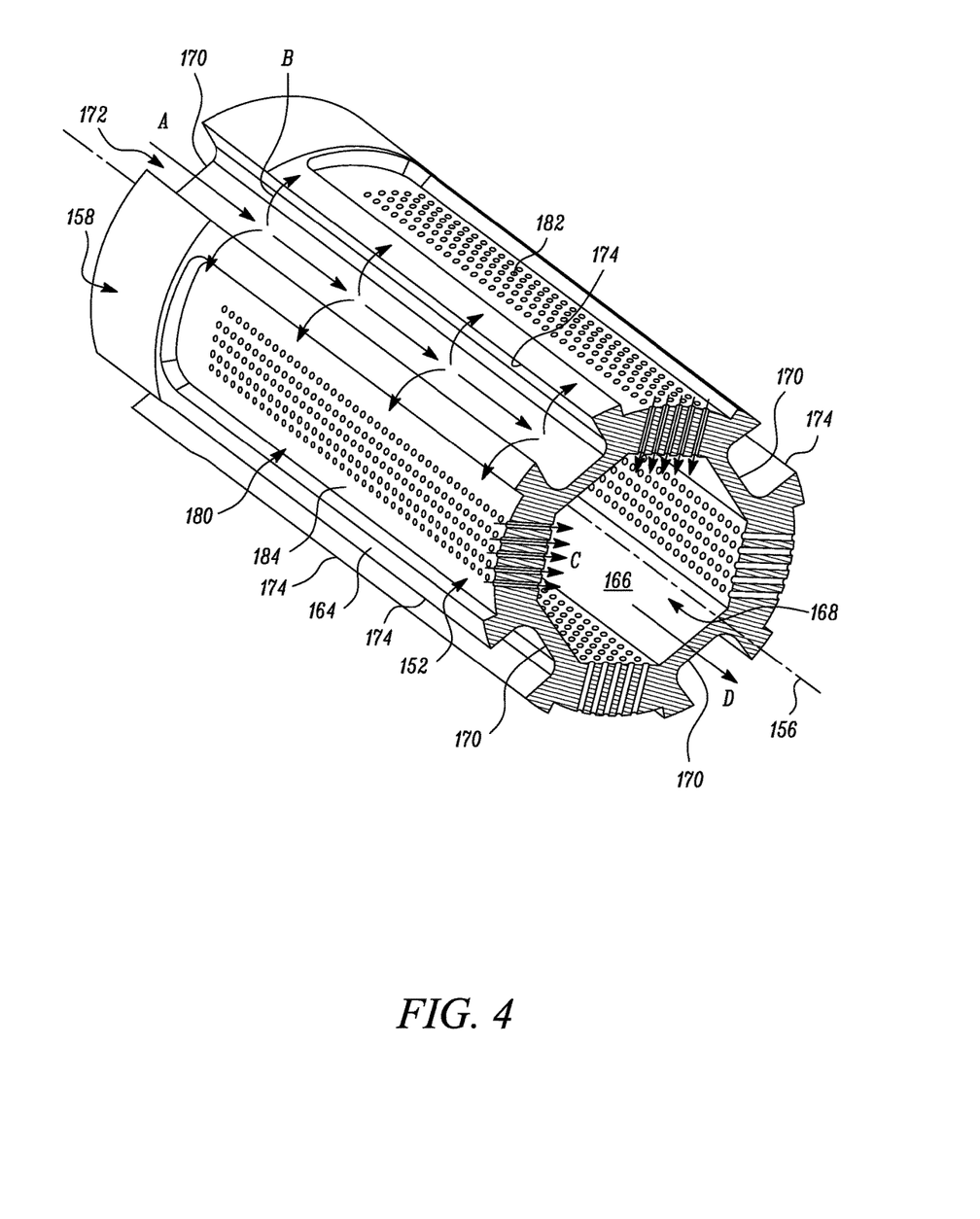
FIG. 4 is a cross-sectional view of the filter, in accordance with the concepts of the present disclosure.

Referring to FIGS. 2, 3, and 4, the filter 122 is adapted to be positioned within the inlet channel 130 to filter the fuel received into the fuel injector 110 from the common rail 108 (see direction, A, FIG. 1). The filter 122 may be disposed upstream of the injector body 120 to ensure that fuel delivered to the outlet channel 136 during an injection event is free of debris. The filter 122 is adapted to filter the fuel in multiple stages. More particularly, the filter 122 is adapted to filter the fuel received from the common rail 108 in two stages. To this end, the filter 122 defines two filtration zones—namely a first filtration zone 150 (see FIG. 2) and a second filtration zone 152 (see FIG. 4). In one example, the first filtration zone 150 is adapted to filter particulate having a size of greater than 75 micrometer ($\mu m$)×1 millimeter (mm)×1 mm. The second filtration zone 152 is configured to filter particulates of a relatively smaller size as compared to the particulates filtered by the first filtration zone 150. In one example, the second filtration zone 152 is adapted to filter particulates having a size greater than 1 mm×65 $\mu m$×65 $\mu m$.

Figure 5:
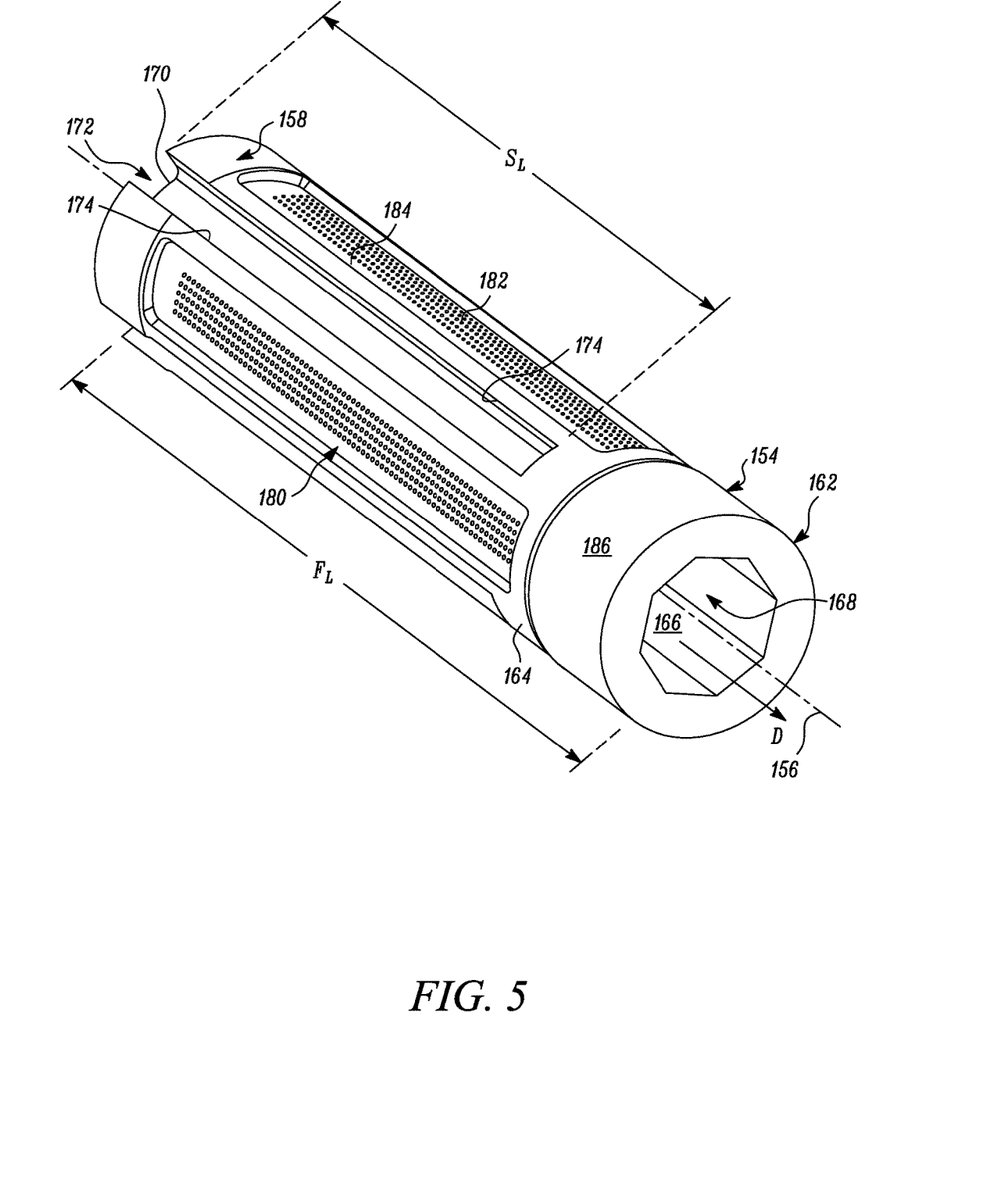
FIG. 5 is a rear isometric view of the filter, in accordance with the concepts of the present disclosure.

Referring to FIGS. 3, 4, and 5, further details of the filter 122 are described. The filter 122 may be an edge filter that includes a body 154, such as an elongated body, that facilitates a filtration process of the fuel across an edge formed on the filter (discussed further below). The body 154 may include a tubular structure, such as having a substantially cylindrical profile, defining a longitudinal axis 156. Various other shapes and profiles, such as an elliptical shape, of the body 154 may also be contemplated. The body 154 defines a first end 158, with a first end face 160, and a second end 162. The second end 162 is opposite to the first end face 160. Further, the body 154 includes an outer surface 164 defined over the body 154 that extends between the first end face 160 and the second end 162. The body 154 also includes an inner surface 166 that defines an inner chamber 168 (see FIGS. 4 and 5) of the body 154. The inner chamber 168 may define a hollow of the body 154 that is also cylindrical in shape, although variations to a shape of the inner chamber 168 is possible. More specifically, the inner chamber 168 is closed at the first end face 160 and is open at the second end 162. The open, second end 162 of the filter 122 facilitates a release of the fuel from the filter 122 into the injector body 120.

Further, as part of the first filtration zone 150, the body 154 includes at least one slot 170 defined on the body 154. In the depicted example, four slots 170 are shown. Additional or lesser number of slots 170 may be contemplated. The slots 170 are equidistantly arrayed over the outer surface 164, around the longitudinal axis 156. It may be appreciated that a description of these four slots will be discussed by way of a single slot 170 alone, and it may be understood that such description may be applicable to each of the four slots 170. As shown, the slot 170 may include a U-shaped cross sectional profile, that extends linearly, axially (i.e. along the longitudinal axis 156), and along the outer surface 164 of the body 154. The slot 170 is open and is in fluid communication with the first end face 160 and the outer surface 164. For example, the slot 170 may include an opening 172 formed at the first end face 160.

Further, the slot 170 defines an edge 174 along the outer surface 164 the body 154. Given the linear profile of the slot 170, the edge 174 has a linear profile too. Accordingly, the edge 174 is also defined along the longitudinal axis 156 of the body 154. In an assembly of the filter 122 within the inlet channel 130, the edge 174 and the inlet channel 130 (i.e. an interior wall 176 of the inlet channel 130) are separated by a clearance 178 (see FIG. 2), and in turn are adapted to define the first filtration zone 150. Further, the body 154 includes a filter length, $F_L$, along the longitudinal axis 156. The slot 170 extends from the first end face 160 along the outer surface 164 and terminates before the second end 162 for a slot length, $S_L$, that is less than the filter length, $F_L$.

Further, as part of the second filtration zone 152, the outer surface 164 of the body 154 defines a recess 180 at the second filtration zone 152. The recess 180 is a generally rectangular shaped depression formed over the outer surface 164 of the body 154, although other shapes and profiles, such as an irregular shape, of the recess 180 may be contemplated. In an embodiment, the recess 180 extends and is defined along the filter length, $F_L$, or the longitudinal axis 156 of the body 154. The body 154 defines at least one perforated portion 182 formed in the outer surface 164, but which is formed within the recess 180. In the depicted example, four perforated portions 182 are shown, with each perforated portion 182 being formed in a dedicated recess 180. Additional or lesser number of perforated portions 182 may be contemplated. These perforated portions 182 are equidistantly arrayed over the outer surface 164, and are formed between successively arranged slots 170, around the longitudinal axis 156. As with a discussion of the slot 170, a description of these four perforated portions 182 may be discussed by way of a single perforated portion 182 alone, and it may be understood that such description will be applicable to each of the four perforated portions 182. The perforated portion 182 may include a number of holes that are arrayed according to multiple rows and multiple columns in the recess 180. It is however possible that a variation be applied in an arrangement of such holes, such as by having irregularly placed holes. In some implementations, a size of the holes may be modified and/or a number of the holes may be increased or decreased for attaining an increased or a decreased flow rate of the fuel through the perforated portion 182. As with the recess 180, the perforated portion 182 may also be defined along a floor 184 of the recess 180, and along the filter length, $F_L$, of the body 154. The perforated portion 182 (i.e. the holes of the perforated portion 182) extends from the outer surface 164 to the inner surface 166 of the inner chamber 168, and in so doing, the inner chamber 168 is in fluid communication with the recess 180 via the perforated portion 182.

Further, a cross-sectional diameter of the outer surface 164 proximal the first end face 160 and a cross-sectional diameter of the outer surface 164 proximal the second end 162 are each greater than a cross-sectional diameter of the outer surface 164 at the first filtration zone 150. In that manner, the outer surface 164 is adapted to define a gap 188 (see FIG. 2) with the interior wall 176 when the filter 122 is assembled within the inlet channel 130. The gap 188 and the clearance 178 enable the slot 170 and the perforated portion 182 to be in fluid communication with each other, with the edge 174 providing fluid communication between the slot 170 and the perforated portion 182 through the clearance 178. Additionally, the outer surface 164 proximal the second end 162 defines an uninterrupted surface 186. The uninterrupted surface 186 is a surface that is formed over the body 154 of the filter 122 that may be press fitted and be fully engaged against the inlet channel 130 (or the interior wall 176), when the filter 122 is positioned within the inlet channel 130. In so doing, a fluid (fuel) flow across the outer surface 164 at the second end 162 is prevented, as the filter 122 receives fuel during operation.

Moreover, the inner chamber 168 (or the inner surface 166) is defined by multiple planar surfaces that are contiguously arrayed around the longitudinal axis 156. Such a contiguous array of surfaces imparts a polygonal cross-section to the inner chamber 168 from the second end 162. The perforated portion 182 is revealed on one or more of the plurality of planar surfaces, as shown. In certain implementations, the holes of the perforated portion 182 may be formed by laser drilling operations.

In certain implementations, the filter 122 is adapted to be press-fitted into the inlet channel 130. In an embodiment, a cross-sectional diameter of the outer surface 164 proximal the first end face 160 is lower than a cross-sectional diameter of the outer surface 164 proximal the second end 162, and the inlet channel 130 is tapered. Such a provision may enable a positive interlock or mating between the second end 162 and the inlet channel, when the filter 122 is assembled within the inlet channel 130, thereby disallowing an incoming fuel to flow past the second end 162 and bypass the two filtrations zones (i.e. the first filtration zone 150 and second filtration zone 152).

The body 154 of the filter 122 may be made of a metallic material, although alloys, and various other high-grade polymers and plastics may also be contemplated. It is also possible for the filter 122 to be manufactured by a 3-D printing process. In some implementations, the filter 122 may be manufactured by casting. In some implementations, the filter 122 is produced by using conventional operations, such as involving turning, boring, and milling.

INDUSTRIAL APPLICABILITY

Debris in the fuel may be a left behind residue from manufacturing or machining in any upstream component such as a pump, a conduit, a valve, etc., of the fuel injection system 104. Debris may also be introduced during a service of the fuel injection system 104. It is also possible that debris may accompany a flow of the fuel. Since tolerances of components of the control valve 124 may be deterministic of an injection pressure accompanying a fuel injection event, and because such debris may damage the injector components, the filter 122 is applied that provides for filtering the fuel in two stages.

As the engine 102 operates in repeated work cycles, fuel is delivered into the combustion chambers of the engine 102 for every expansion/power stroke of the engine 102. During fuel delivery, pressurized fuel is received by the common rail 108, and the fuel is routed further into the fuel injector 110 through the inlet channel 130 that is coupled to the common rail 108. As the fuel flows through the inlet channel 130 (see direction, A), fuel comes into contact with the first end face 160 of the filter 122, and owing to a pressurized fuel flow, the fuel flows into the slot 170, through the opening 172 of the slot 170. Having entered the slot 170, the fuel may traverse across the length, $S_L$, of the slot 170. Thereafter, and because of a continuous fuel supply pressure, the fuel is forced into the clearance 178 that is defined between the edge 174 and the interior wall 176 of the inlet channel 130. As a result, fuel flows substantially laterally to the body 154, along a circumferential direction, as defined by a curvature of the edge 174 (see direction, B). As the fuel flows through the clearance 178, the edge 174 and the inlet channel 130 filters particulates having a size that measure greater than 75 micrometer (μm)×1 millimeter (mm)×1 mm, for example. In some implementations, it is possible that the edge 174 and the inlet channel 130 (i.e. the first filtration zone 150, see FIG. 2) filter particulates that are greater or smaller in size. It may be noted that this first filtration zone 150, defined by the edge 174 and the inlet channel 130, also defines a first filtration stage of the fuel that purifies the fuel of relatively large sized particulates.

After clearing the first filtration zone 150, a consistent or a continuous supply of fuel pressure may further force the fuel to enter the gap 188 defined between the outer surface 164 at the first filtration zone 150 and the interior wall 176. Thereafter, fuel flows into the recess 180, urging the fuel to further flow through the perforated portion 182 formed in the recess 180 (i.e. from the outer surface 164 to the inner surface 166, in a radial direction relative to the filter 122, see direction, C). As the fuel flows from the outer surface 164 to the inner surface 166, the perforated portion 182 filters particulates having a size that measure greater than 1 mm×65 µm×65 µm, for example. It is possible that in some implementations, the second filtration zone 152 filter particulates of a larger or a smaller size as a size of the holes of the perforated portion 182 may be varied depending on the application and an actual filtering requirement. This second filtration zone 152 may also define a second filtration stage of the fuel. Fuel filtered at this stage is a further refined quantity of fuel. Subsequently, fuel filtered at the second filtration zone 152 enters the inner chamber 168 along direction, C, and flows further into the injector body 120 through the open, second end of the body 154 of the filter 122 (direction, D).

Effectively, a filtration of the fuel at the second filtration zone 152 further purifies a quantity of fuel that is already filtered at the first filtration zone 150. Because of a two-stage purification of fuel, a fuel obtained by the fuel injector 110 refrains from interfering with the tolerances between the injector components, thus leading to a longer injector life, higher injection efficiency, and higher injection accuracy. It may be noted that the two filtration zones 150, 152 may help the filter 122 achieve an overall filtration capability of filtering particles that measure greater than 75 µm×65 µm×65 µm. Additionally, the filter 122 may be applied in various other fuel flow regions of the fuel injection system 104. For example, the filter 122 may be applied in adapters, lines, at an entrance or an exit of the common rail 108, etc. Moreover, the filter 122 may also find use in various other environments that use a filtration process, such as the one that has been described above. It may be appreciated that although a use of the filter 122 has been described in relation to a fuel, the filter 122 may also be applied in environments that apply other fluids.

It should be understood that the above description is intended for illustrative purposes only and is not intended to limit the scope of the present disclosure. Thus, one skilled in the art will appreciate that other aspects of the disclosure may be obtained from a study of the drawings, the disclosure, and the appended claim.

What is claimed is:

1. A filter for a fuel injection system, the filter comprising:
a body defining a longitudinal axis, a first end face, a second end opposite the first end face, an outer surface extending between the first end face and the second end, an inner surface defining an inner chamber closed at the first end face and open at the second end, at least one perforated portion formed in the outer surface extending from the outer surface to the inner surface, and at least one slot extending axially along the outer surface, the at least one slot open and in fluid communication with the first end face and defining an edge along the outer surface, the edge providing fluid communication between the at least one slot and the at least one perforated portion in a radial direction, wherein
the edge and an inlet channel of the fuel injection system are adapted to define a first filtration zone,
the at least one perforated portion defines a second filtration zone, and
each said at least one slot is offset in the radial direction from each said at least one perforated portion.

2. The filter of claim 1, wherein the at least one slot is adapted to receive a fuel of the fuel injection system into the filter, and the open, second end of the filter facilitates a release of the fuel from the filter.

3. The filter of claim 1, wherein the body includes a tubular structure, a filter length along the longitudinal axis, the at least one slot extending from the first end face along the outer surface and terminating before the second end for a slot length less than the filter length.

4. The filter of claim 1, wherein the outer surface proximal the second end defines an uninterrupted surface.

5. The filter of claim 1, wherein a cross-sectional diameter of the outer surface proximal the first end face and a cross-sectional diameter of the outer surface proximal the second end are each greater than a cross-sectional diameter of the outer surface at the first filtration zone.

6. The filter of claim 1, wherein the outer surface defines a recess at the second filtration zone, the at least one perforated portion being formed in the recess.

7. The filter of claim 1, wherein the first filtration zone is adapted to filter particulate having a size of greater than 75 micrometer (µm)×1 millimeter (mm)×1 mm and the second filtration zone is adapted to filter particulate having a size greater than 1 mm×65 µm×65 µm.

8. The filter of claim 1, wherein the outer surface includes four slots and four perforated portions.

9. The filter of claim 1,
wherein the inner chamber is defined by a plurality of planar surfaces that are contiguously arrayed around the longitudinal axis, imparting a polygonal cross-section to the inner chamber from the second end,
wherein the at least one perforated portion is revealed on one or more of the plurality of planar surfaces.

10. A fuel injection system for an engine, the fuel injection system comprising:
an inlet channel to receive fuel; and
a filter positioned within the inlet channel, the filter having a body, the body defining a longitudinal axis, a first end face, a second end opposite the first end face, an outer surface extending between the first end face and the second end, an inner surface defining an inner chamber closed at the first end face and open at the second end, at least one perforated portion formed in the outer surface extending from the outer surface to the inner surface, and at least one slot extending axially along the outer surface, the at least one slot open and in fluid communication with the first end face and defining an edge along the outer surface, the edge providing fluid communication between the at least one slot and the at least one perforated portion in a radial direction, wherein
the edge and the inlet channel define a first filtration zone,
the at least one perforated portion defines a second filtration zone, and
each said at least one slot is offset in the radial direction from each said at least one perforated portion.

11. The fuel injection system of claim 10, wherein the open, second end of the filter facilitates a release of the fuel from the filter.

12. The fuel injection system of claim 10, wherein the body includes a tubular structure, a filter length along the longitudinal axis, the at least one slot extending from the first end face along the outer surface and terminating before the second end for a slot length less than the filter length.

13. The fuel injection system of claim 10, wherein the outer surface proximal the second end defines an uninterrupted surface.

14. The fuel injection system of claim 10, wherein a cross-sectional diameter of the outer surface proximal the first end face and a cross-sectional diameter of the outer surface proximal the second end are each greater than a cross-sectional diameter of the outer surface at the first filtration zone.

15. The fuel injection system of claim 10, wherein the outer surface defines a recess at the second filtration zone, the at least one perforated portion being formed in the recess.

16. The fuel injection system of claim 10, wherein the first filtration zone is adapted to filter particulate having a size of greater than 75 micrometer (μm)×1 millimeter (mm)×1 mm and the second filtration zone is adapted to filter particulate having a size greater than 1 mm×65 μm×65 μm.

17. The fuel injection system of claim 10, wherein the edge is between the at least one slot and the at least one perforated portion in the radial direction.

18. The fuel injection system of claim 10,
wherein the inner chamber is defined by a plurality of planar surfaces that are contiguously arrayed around the longitudinal axis, imparting a polygonal cross-section to the inner chamber from the second end,
wherein the at least one perforated portion is revealed on one or more of the plurality of planar surfaces.

19. A fuel injector for a fuel injection system, comprising:
an inlet arm with an inlet channel configured to receive fuel; and
a filter positioned within the inlet channel, the filter having a body, the body defining a longitudinal axis, a first end face, a second end opposite the first end face, an outer surface extending between the first end face and the second end, an inner surface defining an inner chamber closed at the first end face and open at the second end, at least one perforated portion formed in the outer surface extending from the outer surface to the inner surface, and at least one slot extending axially along the outer surface, the at least one slot open and in fluid communication with the first end face and defining an edge along the outer surface, the edge providing fluid communication between the at least one slot and the at least one perforated portion in a radial direction, wherein
the edge and the inlet channel define a first filtration zone,
the at least one perforated portion defines a second filtration zone,
the open, second end of the filter facilitates a release of the fuel from the filter, and
each said at least one slot is offset in the radial direction from each said at least one perforated portion.

20. The fuel injector of claim 19,
wherein the inner chamber is defined by a plurality of planar surfaces that are contiguously arrayed around the longitudinal axis, imparting a polygonal cross-section to the inner chamber from the second end,
wherein the at least one perforated portion is revealed on one or more of the plurality of planar surfaces.

* * * * *